Patented Aug. 7, 1923.

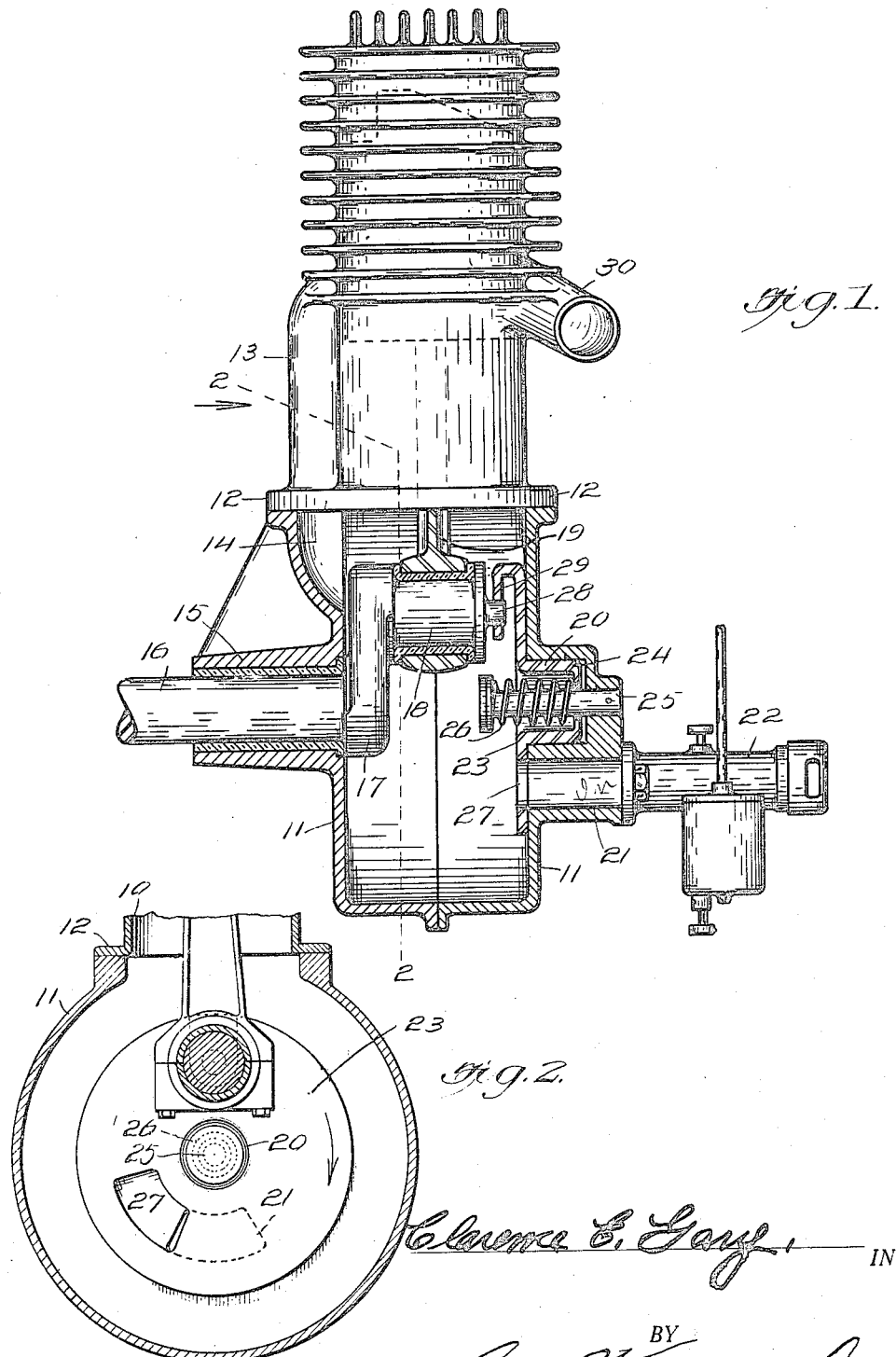

1,464,384

UNITED STATES PATENT OFFICE.

CLARENCE E. GARY, OF SYRACUSE, NEW YORK.

INTERNAL-COMBUSTION ENGINE.

Application filed November 3, 1921. Serial No. 512,537.

*To all whom it may concern:*

Be it known that I, CLARENCE E. GARY, a citizen of the United States, residing at Syracuse, in the county of Onondaga and State of New York, have invented certain new and useful Improvements in Internal-Combustion Engines, of which the following is a specification.

This invention relates to internal combustion motors, and has for one of its objects to simplify the construction, reduce the number of parts and to dispense with the necessity for employing gears, cams, shafts and the like for producing the movements of the valves.

Another object of the invention is to provide a device of this character having means whereby the rotative valve is actuated directly from the shaft of the motor, but independently of the crank shaft.

With these and other objects in view, the invention consists in certain novel features of construction as hereinafter shown and described and then specifically pointed out in the claims, and in the drawings illustrative of the preferred embodiment of the invention.

Figure 1 is a side elevation of a conventional internal combustion motor partly in section, and including the improved construction.

Fig. 2 is a section on the line 2—2 of Fig. 1 looking in the direction of the arrow.

The improved device is designed to be employed more particularly in connection with internal combustion motors of the two cycle type, and for the purpose of illustration is shown applied to a motor of this class, the cylinder being represented at 10, the crank casing at 11, preferably in two parts, and to which the cylinder is coupled at 12.

The cylinder 10 is provided with a jacket indicated at 13, at one side and communicating at the upper end with the cylinder and with a passage 14 providing communication between the jacket and crank case and constituting the transfer port. A bearing 15 is formed upon one section of the crank casing and supports the crank shaft 16, the latter having a crank arm 17 and crank pin 18, the crank shaft being of the overhang form, as shown.

A part of the connecting rod is represented at 19 coupled in the usual manner to the crank pin, and the piston, indicated by dotted lines in Fig. 1.

Formed in one wall of the other section of the crank casing is a socket 20, the center line of the socket being in alinement with the longitudinal axis of the crank shaft, while an intake port 21 is formed in the crank casing adjacent to the socket 20.

A mixing chamber and carbureter of suitable construction and indicated conventionally at 22, are coupled to the casing and connecting with the intake port 21.

Bearing against the inner face of the casing section which contains the socket 20 is a disk valve 23 having a tubular hub or bearing 24 rotatively engaging in the socket 20, as shown. A pin 25 is secured within the socket 20 and extends through the inner end of the hub or bearing 24, and is provided with a spring 26 operating to maintain the disk 23 in yieldable engagement with its seat, especially during the suction stroke, and thus preventing leakage.

The disk valve likewise contains a port 27 adapted to register with the port 21 when the disk valve is disposed in one position.

Extending from the outer end of the crank pin 18 is a stud 28, and extending from the disk valve 23 is a small perforated arm 29 engaging the stud, as shown.

By this simple arrangement it will be obvious that the rotation of the crank shaft will correspondingly rotate the disk or rotary valve.

The exhaust is indicated at 30.

By this simple means, a valve and valve operating mechanism is provided operative directly from the crank shaft and without the necessity for employing gears, cams, or like device, and mounted independently of the crank shaft.

The piston when moving upward in the cylinder creates a depression or partial vacuum in the crank case 11 and the rotating valve 23 coming to a predetermined position relative to the angular position of the crank arm 17 the passage 27 in the valve 23 uncovers the port 21 thus allowing gas or fuel vapor to flow into the crank case. Near the upward end of the piston travel the passage 27 will be rotated past the port opening 21 and communication between crank case and surrounding atmosphere will be cut off.

The time of opening and closing the valve will be determined by the duty required of the engine.

The piston while traveling up compresses a charge of gas in the cylinder which being ignited expands and forces the piston down. The movement of the piston downward causes the gas in the crank chamber 11 to be compressed as all outlets are sealed. On further movement downward exhaust port 30 is uncovered and the burnt gases escape to the exhaust pipe. Shortly after the exhaust port 30 has been uncovered transfer port 14 is uncovered and the compressed charge in the crank chamber 11 rushes up above the piston displacing what burnt gases remain in the cylinder and providing a fresh charge to be compressed and ignited on the next upstroke of the piston.

The rotating valve 23 is retained against its seat normally by the spring 26 which has sufficient strength to resist any movement of the valve away from the valve seat when a slight depression or partial vacuum occurs before the intake port 21 is uncovered. This spring also automatically takes up any wear which may occur between the valve and valve seat.

When compression occurs the spring 26 is assisted by the pressure in the crank case in keeping the valve firmly against its seat and preventing the gas leaking out. The greatest pressure comes on valve at the time when it is most needed and there will be very little wear between the valve and its seat.

In Fig. 2 of the drawing the piston is near the upward end of its stroke and the intake port 21 is nearly covered by rotating valve 23. The direction of rotation being indicated by the arrow.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:—

1. In an internal combustion motor, a crank casing having a shaft bearing in one side and a socket at the other side opening into the casing and in longitudinal alinement with the bearing, said casing having an intake port therethrough at the same side as the socket and spaced therefrom, a shaft engaging in said bearing and having a crank and a crank pin operating in said casing, a plate valve bearing upon the inner face of the casing and provided with a lug engaging in said crank pin and with a slot registering intermittently with the intake port, and means for coupling said valve to said crank pin and rotative thereby.

2. In an internal combustion motor, a crank casing having a shaft bearing in one side and a socket at the other side opening into the casing and in longitudinal alinement with the bearing, said casing having an intake port therethrough at the same side as the socket and spaced therefrom, a headed pin within said socket, a shaft engaging in said bearing and having a crank and a crank pin operating in said casing, a plate valve bearing upon the inner face of the casing and provided with a lug engaging in said crank pin and with an aperture engaging over said lug, said valve having a slot registering intermittently with the intake port, a spring supported by said pin and engaging said stud and operating to hold the valve yieldably upon its seat, and means for coupling said valve to said crank pin and rotative thereby.

In testimony whereof, I affix my signature hereto.

CLARENCE E. GARY.